United States Patent
Jibbe et al.

(10) Patent No.: US 11,301,139 B2
(45) Date of Patent: Apr. 12, 2022

(54) BUILDING STABLE STORAGE AREA NETWORKS FOR COMPUTE CLUSTERS

(71) Applicant: NetApp, Inc., Sunnyvale, CA (US)

(72) Inventors: Mahmoud K. Jibbe, Wichita, KS (US); Dean Lang, Wichita, KS (US); Joey Parnell, Wichita, KS (US); Ryan Rodine, Wichita, KS (US); Joshua Briner, Wichita, KS (US)

(73) Assignee: NETAPP, INC., San Jose, CA (US)

(*) Notice: Subject to any disclaimer, the term of this patent is extended or adjusted under 35 U.S.C. 154(b) by 119 days.

(21) Appl. No.: 16/722,270

(22) Filed: Dec. 20, 2019

(65) Prior Publication Data

US 2020/0125274 A1   Apr. 23, 2020

Related U.S. Application Data

(62) Division of application No. 15/703,169, filed on Sep. 13, 2017, now Pat. No. 10,521,127.

(Continued)

(51) Int. Cl.
*G06F 3/06* (2006.01)
*G06F 12/0808* (2016.01)
(Continued)

(52) U.S. Cl.
CPC ............ *G06F 3/0611* (2013.01); *G06F 3/067* (2013.01); *G06F 3/0619* (2013.01);
(Continued)

(58) Field of Classification Search
CPC .............. G06F 3/00; G06F 3/06–0689; G06F 5/00–16; G06F 9/00–548;
(Continued)

(56) References Cited

U.S. PATENT DOCUMENTS 5,625,811 A * 4/1997 Bhide ................. G06F 9/5061
6,735,715 B1 * 5/2004 Graham ............. G06F 11/2005
714/43

(Continued)

OTHER PUBLICATIONS

Data ONTAP® 7.3 Commands: Manual Page Reference, vol. 1; NetApp, Inc.; Jan. 15, 2010; retrieved from https://csclub.uwaterloo.ca/~ehashman/netapp/ontap/cmdref1.pdf on Jun. 19, 2021 (Year: 2010).*

(Continued)

*Primary Examiner* — Daniel C. Chappell
(74) *Attorney, Agent, or Firm* — Haynes and Boone, LLP

(57) ABSTRACT

Systems and methods that result in a stable storage system are provided. In the storage system, the latency spikes may be reduced when multiple volumes are aggregated into transfer sets according to system characteristics. The storage system transfers ownership of volumes in each transfer set as a single transaction. In the storage system, connectivity between the host and the storage controller is re-established based on the connectivity in a physical transport layer and a single path. In the storage system, pre-mature failback is also avoided when ownership of volumes is transferred back to a preferred storage controller when the same number of paths existed between the host and the preferred storage controller before and after a failover operation. Further, the storage system generates connectivity reports that display connectivity paths between hosts, storage controllers, and volumes.

18 Claims, 6 Drawing Sheets

Related U.S. Application Data

(60) Provisional application No. 62/539,059, filed on Jul. 31, 2017.

(51) Int. Cl.
  *G06F 12/0888* (2016.01)
  *G06F 12/0868* (2016.01)

(52) U.S. Cl.
  CPC .......... *G06F 3/0635* (2013.01); *G06F 3/0665* (2013.01); *G06F 3/0689* (2013.01); *G06F 12/0808* (2013.01); *G06F 12/0868* (2013.01); *G06F 12/0888* (2013.01); *G06F 2212/1024* (2013.01); *G06F 2212/313* (2013.01); *G06F 2212/502* (2013.01); *G06F 2212/621* (2013.01)

(58) Field of Classification Search
  CPC ..... G06F 11/30–3696; G06F 12/00–16; G06F 13/00–4295; G06F 16/00–986; G06F 17/00–5095; G06F 21/00–88; G06F 2003/0691–0698; G06F 2009/3883; G06F 2009/45562–45595; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153
  See application file for complete search history.

(56) References Cited

U.S. PATENT DOCUMENTS

| | | | |
|---|---|---|---|
| 7,296,068 B1* | 11/2007 | Sarma | G06F 3/061 709/223 |
| 7,424,637 B1* | 9/2008 | Schoenthal | G06F 3/0607 711/161 |
| 7,467,191 B1* | 12/2008 | Wang | G06F 11/2092 709/221 |
| 7,739,614 B1* | 6/2010 | Hackworth | H04L 69/329 715/771 |
| 8,161,076 B1* | 4/2012 | Jernigan, IV | H04L 67/1097 707/793 |
| 8,230,085 B2* | 7/2012 | Roa | G06F 3/0661 709/229 |
| 8,751,533 B1* | 6/2014 | Dhavale | G06F 3/067 707/782 |
| 10,296,429 B2* | 5/2019 | Kawaguchi | G06F 3/0619 |
| 10,459,640 B2 | 10/2019 | Parnell et al. | |
| 10,521,127 B2* | 12/2019 | Jibbe | G06F 12/0888 |
| 2004/0088483 A1* | 5/2004 | Chatterjee | G06F 3/0647 711/114 |
| 2014/0189252 A1* | 7/2014 | Biswas | G06F 12/0884 711/142 |
| 2015/0293708 A1* | 10/2015 | Lang | G06F 3/067 711/114 |
| 2017/0220249 A1* | 8/2017 | Jibbe | G06F 11/0727 |
| 2019/0102093 A1* | 4/2019 | Parnell | G06F 11/3409 |

OTHER PUBLICATIONS

Y. Amir, R. Caudy, A. Munjal, T. Schlossnagle and C. Tutu, "N-way fail-over infrastructure for reliable servers and routers," 2003 International Conference on Dependable Systems and Networks, 2003. Proceedings., 2003, pp. 403-412 (Year: 2003).*

A. Thomasian, "Rebuild options in RAID5 disk arrays," Proceedings. Seventh IEEE Symposium on Parallel and Distributed Processing, 1995, pp. 511-518 (Year: 1995).*

\* cited by examiner

BUILDING STABLE STORAGE AREA NETWORKS FOR COMPUTE CLUSTERS

CROSS-REFERENCE TO RELATED APPLICATION

This application is a divisional of U.S. patent application Ser. No. 15/703,169, filed on Sep. 13, 2017, which claims priority to U.S. Provisional Application No. 62/539,059, filed on Jul. 31, 2017, each of which is hereby incorporated by reference in its entirety.

TECHNICAL FIELD

The disclosure relates to large data storage systems, and more specifically, to reducing latency issues in the large data storage systems.

BACKGROUND

Large data storage systems are connected to multiple hosts equipped with different operating systems. The hosts issue numerous read and write data transactions that manipulate data within the large data storage systems. To balance the transaction load, large data storage systems include redundant storage controllers that utilize a volume ownership-based caching model. In the volume ownership-based caching model, each storage controller is assigned one or more volumes. That storage controller than processes data transactions that manipulated data in the assigned volumes.

When data storage systems transfer ownership of the volumes between storage controllers various latency issues arise. These latency issues include latency spikes and unpredictable response times to the data transactions issued by the hosts. Latency issues arise when volumes repeatedly change ownership between storage controllers. Latency issues also arise when data associated with volumes is flushed from a memory cache to underlying storage devices because of the ownership change. Additionally, latency issues arise when volumes change ownership during failover, failback, and realignment operations. Finally, latency issues arise when hosts cannot access volumes through a preferred path.

These latency issues delay the systems' response to data transactions, negatively affect the systems' performance, and frustrate users. As such, there is a need for systems and methods that reduce latency spikes and minimize unpredictable latency behavior.

BRIEF DESCRIPTION OF THE DRAWINGS

The disclosure is best understood from the following detailed description when read with the accompanying figures.

DETAILED DESCRIPTION

Figure 1:
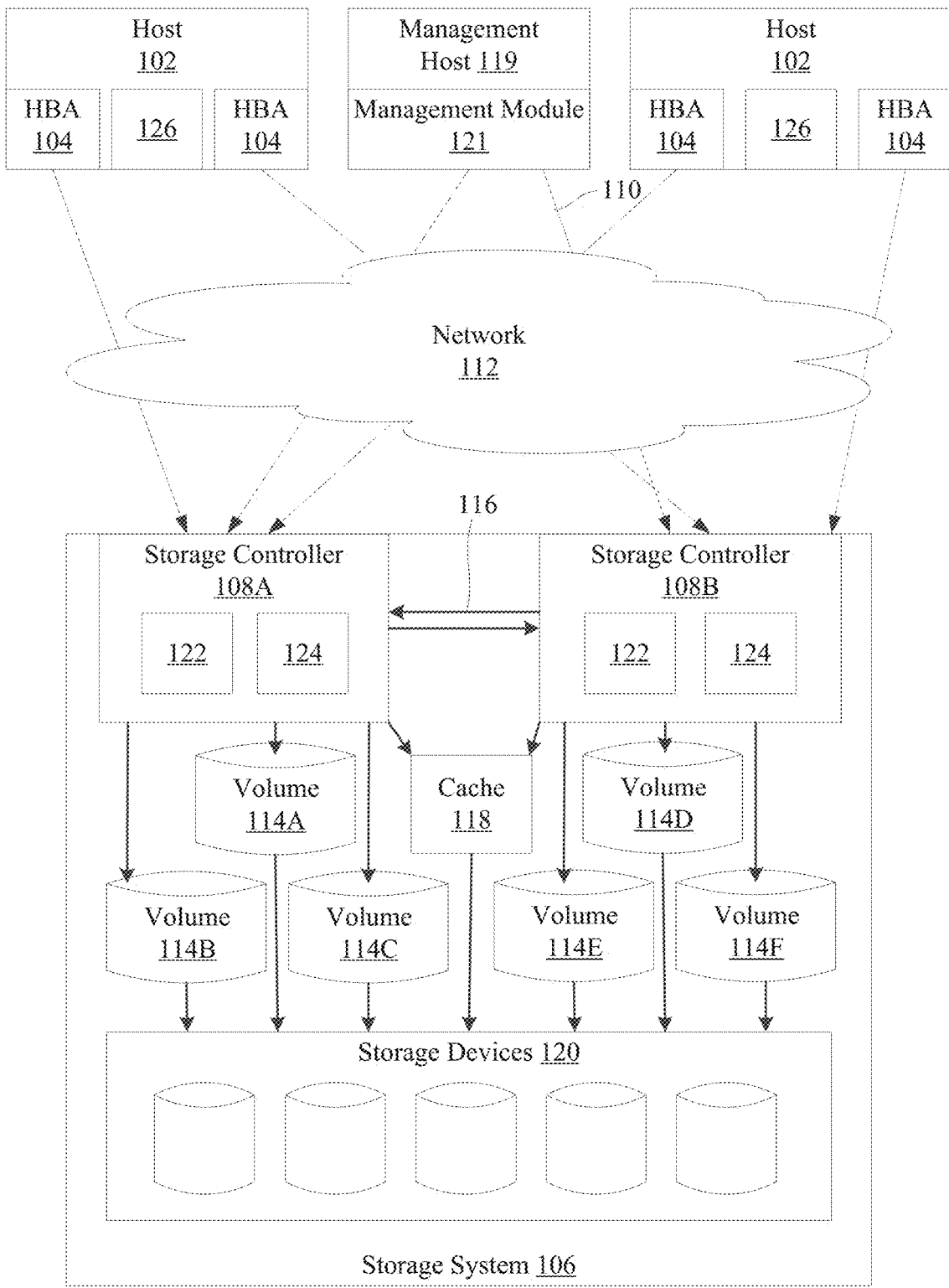
FIG. 1 is a block diagram of storage architecture where embodiments can be implemented.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments except where explicitly noted. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for providing connectivity reporting. In an exemplary embodiment, a storage controller includes a connectivity tracking module. The connectivity tracking module generates connectivity reports for display on a management host. The connectivity reports indicate whether paths and redundant paths exist between a host and storage system, whether a volume is on a preferred or a non-preferred path, which hosts and storage devices are affected when a loss of connection between a host and a storage system occurs, which storage controller is affected by a connectivity fault, in some embodiments. In further embodiments, the management host receives the connectivity reports and displays the connectivity reports on the display screen.

Various embodiments include systems, methods, and machine-readable media for batching volumes into transfer sets. In an exemplary embodiment, a volume transfer module batches volumes into transfer sets according to system criteria. Example criteria include media type of storage devices that are mapped to the volumes, ownership of the volumes, RAID volume membership, application workload type, etc. The volume transfer module transfers ownership of volumes in each transfer set between storage controllers in a single transaction.

Batching volumes into transfer sets according to the system criteria reduces latency issues, such as latency spikes in the system because the volumes in the same transfer set are likely to experience the same or approximately the same I/O throughput delays. This reduces a likelihood of a scenario where a single volume with a low I/O throughput in the transfer set causes I/O throughput delays for data stored in other volumes.

Various embodiments include systems, methods, and machine-readable media for identifying a path between a host and volume. In an exemplary embodiment, when a quick loss of connection occurs between the host and volume, the host may not initiate or may partly initiate a reconnection process because a connection is quickly reestablished. The connectivity tracking module, however, detects the connection loss and expects identification query commands from the host multipath driver that indicate the connection discovery process. However, because the host does not initiate or only partly initiates a reconnection process, the host multipath driver does not detect a connection loss and does not initiate the discovery process that re-establishes a connection. As a result, the connectivity tracking module does not reestablish paths between the host and the volume and operates as though there is no connection with the host. To determine that a connection has been re-established, the connectivity tracking module identifies a connection using a connection at a physical transport layer and identification query messages from a host on a single path.

Identifying a connection based on a connection at a physical transport layer and a single path reduces latency and latency spikes because a storage system is able to identify connectivity paths between hosts and storage controllers that it otherwise would not identify, and use these connectivity paths to transfer I/O requests to and from the storage system.

Various embodiments include systems, methods, and machine-readable media for avoiding bandwidth limitation during a failback operation. In an exemplary embodiment, a volume transfer module determines a number of paths that existed between a host and a storage controller for a volume before a connectivity fault and a resulting failover operation. After the storage controller recovers from the fault, the volume transfer module determines that at least the same number of paths exists between the host and the storage controller before initiating a failback operation for the volume.

Transferring the volume back to the storage controller when at least the same number of paths exists between the host and the storage controller before and after the failover operation ensures that the I/O throughput would have the same or approximately the same bandwidth to transfer data before and after the storage controller experienced a connectivity fault. This would further prevent a scenario where the storage controller has reestablished a connection with the host using fewer paths and, as a result, does not have enough bandwidth to handle the I/O throughput to the volume without potentially experiencing latency spikes.

FIG. 1 is a schematic diagram of exemplary system 100 where embodiments of the disclosure can be implemented. The storage architecture 100 includes a number of hosts 102 in communication with a number of storage systems 106. It is understood that for clarity and ease of explanation, only a single storage system 106 is illustrated, although any number of hosts 102 may be in communication with any number of storage systems 106. Furthermore, while the storage system 106 and each of the hosts 102 are referred to as singular entities, storage system 106 or host 102 may include any number of computing devices and may range from a single computing system to a system cluster of any size. Accordingly, each host 102 and storage system 106 includes at least one computing system, which in turn includes a processor such as a microcontroller or a central processing unit (CPU) operable to perform various computing instructions. The computing system may also include a memory device such as random access memory ("RAM"); a non-transitory computer-readable storage medium such as a magnetic hard disk drive ("HDD"), a solid-state drive ("SSD"), or an optical memory (e.g., CD-ROM, DVD, BD); a video controller such as a graphics processing unit ("GPU"); a communication interface such as an Ethernet interface, a Wi-Fi (IEEE 802.11 or other suitable standard) interface, or any other suitable wired or wireless communication interface; and/or a user input/output ("I/O") interface coupled to one or more user I/O devices such as a keyboard, mouse, pointing device, or touchscreen.

With respect to the hosts 102, each host 102 includes any computing resource that is operable to exchange data with a storage system 106 by initiating data transactions to the storage system 106. In an exemplary embodiment, host 102 includes one or more host bus adapters (HBAs) 104 in communication with storage controllers 108A and 108B (collectively referred to as storage controllers 108) of storage system 106. The HBA 104 provides an interface for communicating with one or more storage controllers 108, and in that regard, may conform to any suitable hardware and/or software protocol. In various embodiments, the HBAs 104 include Serial Attached SCSI ("SAS"), iSCSI, InfiniBand, Fibre Channel, Fibre Channel over Ethernet ("FCoE") and/or Non-Volatile Memory express ("NVMe") over Fabrics bus adapters. Other suitable protocols include SATA, eSATA, PATA, USB, and FireWire. In the illustrated embodiment, HBA 104 is connected to a single storage controller 108, although in other embodiments, an HBA 104 is coupled to more than one storage controller 108. Communications paths between the HBAs 104 and the storage controllers 108 are referred to as paths or links 110. A link 110 may take the form of a direct connection (e.g., a single wire or other point-to-point connection), a networked connection, or any combination thereof. Thus, in some embodiments, one or more links 110 traverse a network 112, which may include any number of wired and/or wireless networks such as a Local Area Network ("LAN"), an Ethernet subnet, a PCI or PCIe subnet, a switched PCIe subnet, a Wide Area Network ("WAN"), a Metropolitan Area Network ("MAN"), the Internet, or the like. In many embodiments, one or more hosts 102 have multiple links 110 with one of storage controllers 108 for redundancy. The multiple links 110 may be provided by a single HBA 104 or multiple HBAs 104. In some embodiments, links 110 operate in parallel to increase bandwidth.

To interact with (e.g., read, write, modify, etc.) remote data, host 102 sends one or more data transactions to the respective storage system 106 via link 110. Data transactions are requests to read, write, or otherwise access data stored within a data storage device such as the storage system 106, and may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information. The read and/or write requests are also referred to as I/O requests.

Turning now to storage system 106, exemplary storage system 106 includes storage controllers 108, volumes 114, cache 118, and storage devices 120. In an embodiment, storage system 106 responds to data transactions from hosts 102 in a way that the storage devices 120 appear to be directly connected (local) to hosts 102. Storage system 106 may group storage devices 120 for speed and/or redundancy using a virtualization technique such as RAID (Redundant Array of Independent/Inexpensive Disks). At a high level, virtualization includes mapping physical addresses of the storage devices into a virtual address space and presenting the virtual address space to hosts 102. In this way, storage system 106 represents one or more storage devices 120 as a single device, often referred to as a volume 114. As shown in FIG. 1, storage devices 120 are configured into volumes 114A-F (collectively referred to as volumes 114). Thus, host 102 can access volumes 114 without concern for how it is distributed among the underlying storage devices 120.

Storage devices 120 include HDDs, SSDs, optical drives, and/or any other suitable volatile or non-volatile data storage medium. In many embodiments, the storage devices 120 are arranged hierarchically and include a large pool of relatively slow storage devices that communicate with one or more caches 118 (i.e., smaller memory pools typically utilizing faster storage media). Portions of the address space of storage devices 120 are mapped to cache 118 so that transactions directed to mapped addresses can be serviced using the cache 118. Accordingly, the larger and slower memory pool is accessed less frequently and in the background. In an embodiment, storage devices 120 may be organized into an array.

The storage controllers 108 may also be in communication with cache 118. Cache 118 may be configured as a single or multiple temporary storage devices and may be controlled by one or more storage controllers 108. Cache 118 may be configured to cache data on behalf of the storage devices 120. That is, storage controllers 108 may temporarily store data in cache 118 prior to flushing the data to storage devices 120. Typically, cache 118 may include a plurality SSDs and/or random-access memory configured as a RAM disk. In an embodiment, data stored in cache 118 may be retrieved faster from cache 118 than from storage devices 120.

As discussed above, storage system 106 includes one or more storage controllers 108 in communication with storage devices 120 and cache 118. Example storage controllers 108 shown in FIG. 1 are storage controllers 108A and 108B. The storage controllers 108 exercise low-level control over the storage devices 120 in order to execute (perform) data transactions on behalf of the hosts 102, and in so doing, may present a group of storage devices 120 to host 102 as a single volume 114. In the illustrated embodiment, storage system 106 includes storage controllers 108A and 108B in communication with volumes 114 created from a group of storage devices 120. A backplane connects the volumes 114 to the storage controllers 108, and where volumes 114 are coupled to two or more storage controllers 108. In an embodiment, a single storage controller 108 may be designated as the owner of each volume 114. In such embodiments, only the storage controller 108 that has ownership of a volume 114 may directly read to or write from that volume 114. As illustrated in FIG. 1, storage controller 108A is designated as an owner of volumes 114A-C and storage controller 108B is designated as an owner of volumes 114D-F.

If one of storage controllers 108 receives a data transaction that accesses data in one of volumes 114 that is not owned by that storage controller 108, the data transaction may be forwarded to the storage controller 108 that owns volume 114 via an inter-controller bus 116. For example, if storage controller 108A receives a data transaction that reads data from or writes data to volume 114D which is owned by storage controller 108B, storage controller 108A would forward the data transaction to storage controller 108B via inter-controller bus 116. Any response, such as data read from volume 114D, may then be communicated from storage controller 108B to storage controller 108A across the inter-controller bus 116 where the response is then sent to host 102.

In an embodiment, one of storage controllers 108, such as storage controller 108A may malfunction. When storage controller 108A malfunctions, a failover operation occurs. In a failover operation, storage system 106 or components within storage system 106 may transfer volumes 114 owned by storage controller 108A (volumes 114A-C) to storage controller 108B. Once storage controller 108A recovers and begins to function according to the system requirements, a failback operation occurs. In a failback operation, storage system 106 or components within storage system 106 transfer volumes 114A-C from storage controller 108B back to storage controller 108A. In a further embodiment, the failover and failback operations are not limited to when storage controller 108A malfunctions, and may also occur when other system components malfunctions, when cables in network 112 malfunction, when storage system 106 performs a realignment operation that changes ownership of volumes 114 among storage controllers 108, etc.

In an embodiment, storage system 106 may experience latency spikes in processing I/O throughput between hosts 102 to volumes 114. The latency spikes may be attributes to failover and failback operations, though the implementation is not limited to these embodiments. Example latency spikes occur when host 102 issues one or more I/O requests but has not received I/O responses to the requests for a period of time that is above a predefined threshold. The embodiments below describe how storage system 106 may reduce or minimize latency spikes.

Global Connectivity Reporting Independent of an Automatic Load Balancer

In an embodiment, storage system 106 may include an automatic load balancer (not shown). The load balancer may issue instructions that cause storage system 106 to rebalance workload across storage controllers 108, such as storage controllers 108A and 108B. In an embodiment, workload may be rebalanced by changing ownership of volumes 114 owned by storage controllers 108A and 108B. To rebalance work load, the automatic load balancer uses connectivity tracking features that track connectivity paths and redundant paths (links 110) between hosts 102 and storage controllers 108. Because the automatic load balancer tracks connectivity paths, the automatic load balancer also reports connectivity issues that occur in the storage system 106.

To report connectivity issues, the automatic load balancer generates one or more message alerts. Because connectivity issues may result in a failover and/or failback operations, the reports may also indicate whether a failover operation and/or failback operation has or will occur. In some embodiments, a management host 119 (described below) may issue instructions to disable the automatic load balancer. This can occur, for example, when management host 119 receives instructions from the system administrator to disable the automatic load balancer so that management host 119 and/or the software that is executing on management host 119 can receive further instructions to manually rebalance the workload among multiple storage controllers 108. However, because the automatic load balancer includes connectivity tracking features, when management host 119 disables the automatic load balancer, management host 119 also disables the connectivity tracking features that identify links 110 and track connectivity between host 102 and storage controllers 108.

In an embodiment, to monitor connectivity, latency, and/or latency spikes when the automatic load balancer is disabled and/or separately from the automatic load balancer, storage system 106 includes a connectivity tracking module 122. Connectivity tracking module 122 may be included within storage controller 108A, storage controller 108B, combination of storage controllers 108A and 108B, or in other components of storage system 106. Connectivity tracking module 122 may generate connectivity reports that specify connectivity issues. Example connectivity issues may include conditions where host 102 appears to be connected at the network protocol-layer to storage controller 108A but not storage controller 108B. Such scenario may occur when host 102 appears to be connected to the preferred storage controller, such as storage controller 108A, but not to the non-preferred storage controller, such as storage controller 108B. Another example connectivity issue may include a condition where protocol-level connectivity between host 102 and storage controller 108A exists at the physical layer, but the host multipath driver (discussed below) may not have discovered link 110 that correspond to the physical-level connectivity. Other connectivity issues include connectivity loss on redundant connectivity paths, and storage controllers 108, storage devices 120, volumes 114 and hosts 102 affected by the connectivity loss.

In an embodiment, system 100 also includes a management host 119. Management host 119 may be a portable or non-portable computing device, such as a laptop, a desktop, etc., that may be under control of a system administrator. In one embodiment, management host 119 may include a management module 121. The management module 121 may receive instructions from a system administrator via management host 119 to enable, disable, and/or reconfigure one or more components in storage system 106. In another embodiment (not shown), management module 121 may also execute within storage controllers 108A and/or 108B.

Figure 6:
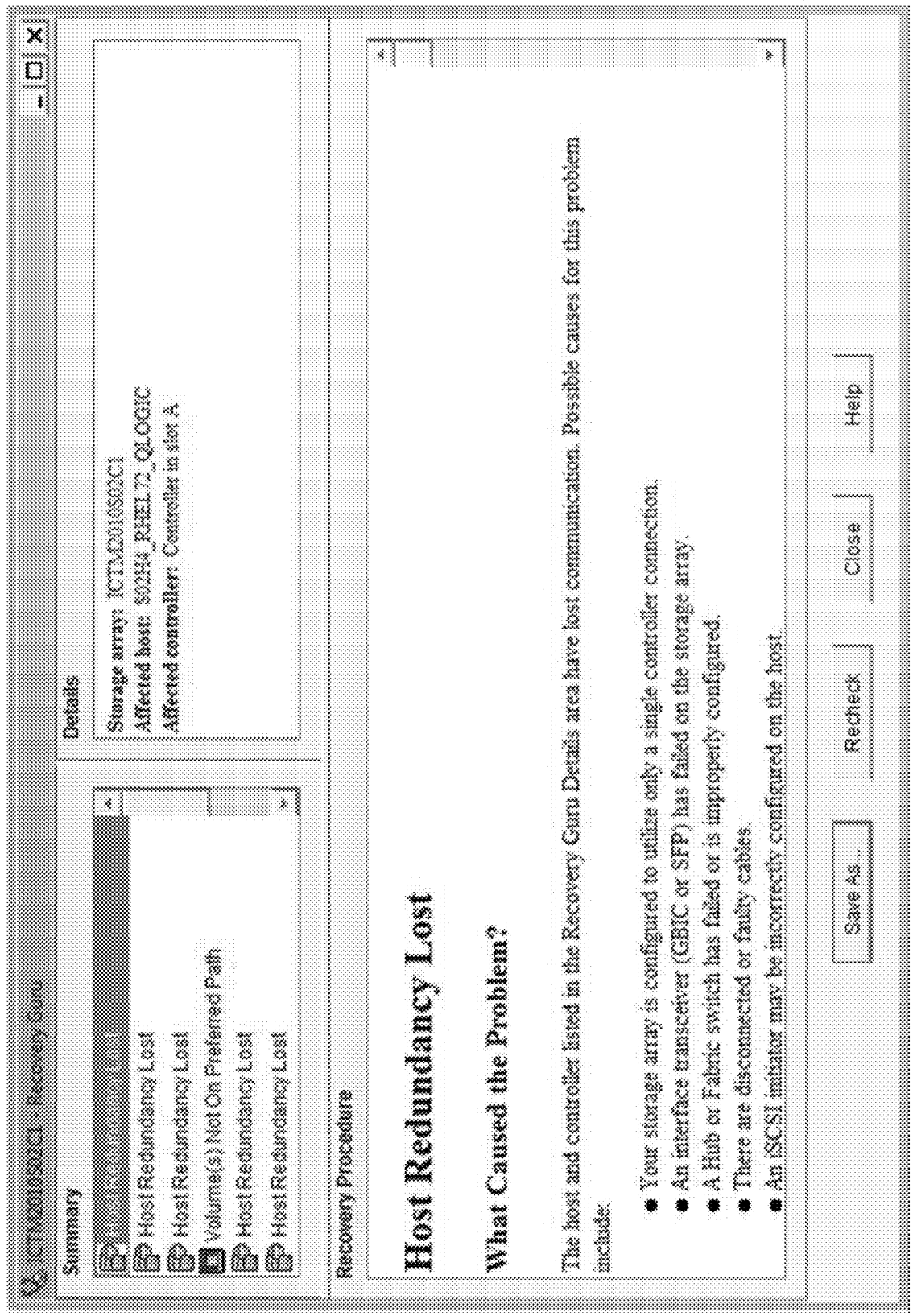
FIG. 6 is a screen-shot of a connectivity report, according to an embodiment.

In an embodiment, once connectivity tracking module 122 generates connectivity reports, connectivity tracking module 122 transmits these connectivity reports to management module 121. Each connectivity report may be a single report or a combination of multiple messages that report connectivity in storage system 106. FIG. 6 is an example connectivity report that may be received and displayed on a display screen of management host 119. The connectivity reports may indicate connectivity issues between hosts 102 and storage controllers 108, loss of redundant connectivity paths between hosts 102 and volumes 114, affected storage controllers 108, storage devices 120 and volumes 114, etc. Further connectivity reports may also indicate conditions that may result in a failover and failback operations and lead to I/O latency and latency spikes. Because connectivity tracking module 122 operates separately from the automatic load balancer, a system administrator may receive connectivity reports via management module 121 independent from the automatic load balancer. As such, connectivity reporting in system 100 is not affected when management module 121 disables the automatic load balancer.

Figure 2:
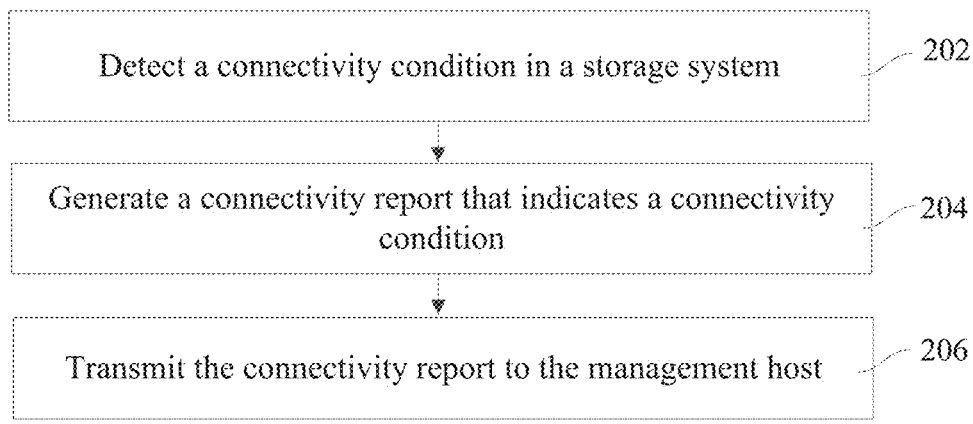
FIG. 2 is a flowchart of a method for reporting connectivity, according to an embodiment.

FIG. 2 is a flowchart of a method 200 for reporting connectivity, according to an embodiment. Method 200 may be implemented in hardware, software, or a combination thereof, of the components described in FIG. 1. As discussed above, method 200 occurs outside of the automatic load balancer.

At operation 202, a connectivity condition is detected. For example, a connectivity condition that indicates that a communication path exists between host 102 and storage controller 108A, but not storage controller 108B is detected. In another example, a connectivity condition that indicates that a connection between host 102 and storage controller 108A exists at the physical layer but not at a network layer is detected.

At operation 204, a connectivity report is generated. For example, connectivity tracking module 122 generates a report that includes a connectivity condition identified in operation 202. As discussed above, the connectivity report is generated separately from the automatic load balancer, and irrespective of whether the automatic load balancer is enabled or disabled.

At operation 206, the connectivity report is transmitted to a management host. For example, the connectivity tracking module transmits the connectivity report to management module 121 of management host 119. Upon receipt, management module 121 may cause management host 119 to display the connectivity report as illustrated in FIG. 6.

Batching Volumes to Minimize I/O Latency Spikes

In an embodiment, storage system 106 may include a volume transfer module 124. Volume transfer module 124 may be implemented within storage controllers 108A and/or 108B or within other components of storage system 106. Volume transfer module 124 may transfer the ownership of volumes 114 between storage controllers 108 during failover and failback operations. For instance, when there is a fault condition that affects storage controller 108A, volume transfer module 124 may transfer modules 114A-C from storage controller 108A during a failover operation. Once storage controller 108A recovers from the fault condition, volume transfer module 124 may transfer volumes 114A-C from storage controller 108B back to storage controller 108A during a failback operation. In another example, volume transfer module 124 may transfer volumes 114A from storage controller 108A to storage controller 108B due to realignment operations. Realignment operation may also be included in a failover operation, in some embodiments. Example realignment operation may be based on access characteristics for volume 114A and excessive I/O requests from host 102 to volume 114A. Also, a realignment operation may occur because a fault in storage controller 108A may require ownership of volumes 114A-C to be temporarily transferred to the working storage controller 108B, but due to bandwidth in system 100, the ownership of some or all of volumes 114A-C may be permanently reconfigured to remain with the storage controller 108B. In other embodiments, host 102 may request volume 114A to be transferred between storage controller 108A and storage controller 108B. In yet another example, storage controllers 108A and 108B may perform dynamic load optimization or automatic load balancing based on the load characteristics of storage devices 120.

The examples described above may result in the volume transfer module 124 transferring ownership of multiple volumes 114 between storage controllers 108A and 108B. When multiple volumes 114 are transferred in a single transaction, the I/O requests to volumes 114 may incur a latency penalty and experience latency spikes. The I/O latency and latency spikes may be further exacerbated by storage system 106 that include storage devices 120 with mixed media types, such as HDD and SSD. This is because a transfer of ownership of volumes 114 that include HDD devices take more times than transfer of ownership of volumes that include SSD devices. In this way, the latency spikes may impact high-performing storage media devices, such as SSD.

Consider volume transfer module 124 transferring ownership of volumes 114A-C from storage controller 108A to storage controller 108B. As volume transfer module 124 transfers ownership of volumes 114A-C, storage system 106 may perform steps below that may cause I/O latency and generate latency spikes. For instance, the storage system 106 may change the volume caching model in cache 118 from a write-back model to a write-thru model. In a write-back model, storage system 106 stores data changes from the I/O requests in cache 118 and then transfers the data to the respective volumes 114A-C and underlying storage devices 120 at a later time. In a write-thru model, the data changes from the I/O requests are stored directly in the respective volume 114A-C and underlying storage devices 120 and not in cache 118 before an I/O response is sent to the initiating host 102. Next, storage system 106 may flush data in cache 118 to the respective volume 114A-C and underlying storage devices 120. Once storage system 106 flushes data from cache 118, storage system 106 may stop I/O requests generated by hosts 102 from reaching volume 114A-C (this process is also referred to as volume quiescence). After volume quiescence, volume transfer module 124 transfers ownership of volumes 114A-C from storage controller 108A to storage controller 108B. After volume 114A-C are transferred to storage controller 108B, storage system 106 may terminate volume quiescence and hosts 102 may begin sending the I/O requests to volumes 114A-C via storage controller 108B.

In an embodiment, each of the operations that occur while volume transfer module 124 transfers volumes A-C from storage controller 108A to 108B may increase the I/O latency. Further, if volumes 114A-C are transferred together in a single transaction or batch, the above operations incur latency of the slowest volume for all volumes 114A-C. This is because storage system 106 may have to wait for all outstanding I/O requests to complete and for the data to be stored in volumes 114A-C prior to achieving volume quiescence. For example, suppose volumes 114B and 114C are fast volumes that are backed by SSD, while volume 114A is a slow volume that is backed by HDD. In this case, the outstanding I/O requests that store data in volumes 114B and 114C will complete faster than the outstanding I/O requests that store data in volume 114A. However, since volumes 114A-C are batched together, volumes 114B and 114C may have to wait for the I/O requests that store data on volume 114A to complete.

In embodiments where storage controller 108A fails, high I/O latency may be acceptable because volume transfer module 124 may need to transfer ownership of volumes 114A-C to the functioning storage controller 108B as soon as systematically possible and regardless of impact to the I/O latency. However in other embodiments, volume transfer module 124 may transfer ownership of volumes 114A-C in a way that reduces latency and/or latency spikes. In one example, volume transfer module 124 may maintain longer quiescence timeouts. In another example, volume transfer module 124 may organize volumes 114A-C into batches or transfer sets, and transfer ownership of the volumes in a transfer set as a single group. In this case, the storage controller 108A may remain in a write-thru mode for a longer period of time while smaller subsets of volumes 114 are transferred to minimize the I/O latency impact.

In an embodiment, volume transfer module 124 may organize volumes 114 into transfer sets immediately or build transfer sets by waiting and aggregating several requests from hosts 102, storage controllers 108A and 108B or other components in storage system 106.

In an embodiment, volume transfer module 124 may organize volumes 114 into transfer sets according to characteristics of volumes 114, storage controllers 108, storage system 106 and/or storage devices 120. For instance, volume transfer module 124 may organize volumes 114 into transfer sets according to volume ownership. Consider an example where volume transfer module 124 transfers ownership of volumes 114A and 114B from storage controller 108A to storage controller 108B and volume 114F from storage controller 108B to storage controller 108A. Instead of transferring volumes 114A, 114B, and 114F as a single transaction, volume transfer module 124 may group volumes 114A, 114B, and 114F into transfer sets according to the storage controller ownership. As such, volume transfer module 124 may aggregate volumes 114A and 114B into a first transfer set, and volume 114F into a second transfer set. The volume transfer module 124 may then transfer the first transfer set from storage controller 108A to storage controller 108B in the first transaction, and transfer the second transfer set from storage controller 108B to storage controller 108A in a second transaction, or vice versa. In this way, volume transfer module 124 would separate volumes 114 that are owned by different storage controllers 108 into different transactions and would thus avoid expensive flushing of cache 118 for both storage controllers 108A and 108B in a single transaction.

In another embodiment, volume transfer module 124 may separate volumes 114 into transfer sets according to a storage media type. Referring to example with volumes 114A-C where volumes 114B and 114C may be SSD volumes while volume 114C may be an HDD volume, volume transfer module 124 may separate volumes 114B and 114C into one transfer set, and volume 114A into a different transfer set. Once separated, the volume transfer module 124 may transfer volumes 114B and 114C in the SSD transfer set in one transaction and volume 114A in the HDD transfer set in another transaction. In this way, volumes 114 that have the same media type may be transferred in the same transaction, and a single transaction will not include volumes having different media types.

In another embodiment, volume transfer module 124 may separate volumes 114 into transfer sets according to a RAID volume group membership. In this way, volume transfer module 124 may not transfer volumes 114 that are backed by the same physical storage media, such as storage devices 120.

In an embodiment, volume transfer module 124 may separate volumes 114 according to characteristics of storage devices 120. For example, volume transfer module 124 may separate volumes 114 according to the storage media type that impacts performance. These characteristics may generate transfer sets according to storage devices 120 that have slower and faster performance. Example characteristics include spindle speed in HDD, architecture type in SSD (e.g. SLC/MLC, NAND/NOR), whether storage media is enterprise versus consumer class media, ongoing operations on the storage media (e.g. TRIM, wear leveling, defragmentation), and drive queue depth. In another embodiment, volume transfer module 124 may also avoid volumes 114 that store data for applications with different application workload types in the same transaction. This can occur when storage devices 120 are aware of applications that store data within the storage devices 120. For example, volume transfer module 124 may separate volumes 114 into transfer sets that include a single or like media characteristics, such as database workload, virtual desktop infrastructure ("VDI") workload, etc. In another example, volume transfer module 124 may also determine transfer sets for volumes 114 based on characteristics of underlying storage media or workload type in a redundant storage system.

In an embodiment, once volume transfer module 124 separates volumes 114 into transfer sets, volume transfer module 124 may sequentially transfer the ownership of volumes in each transfer set as a single transaction.

Figure 3:
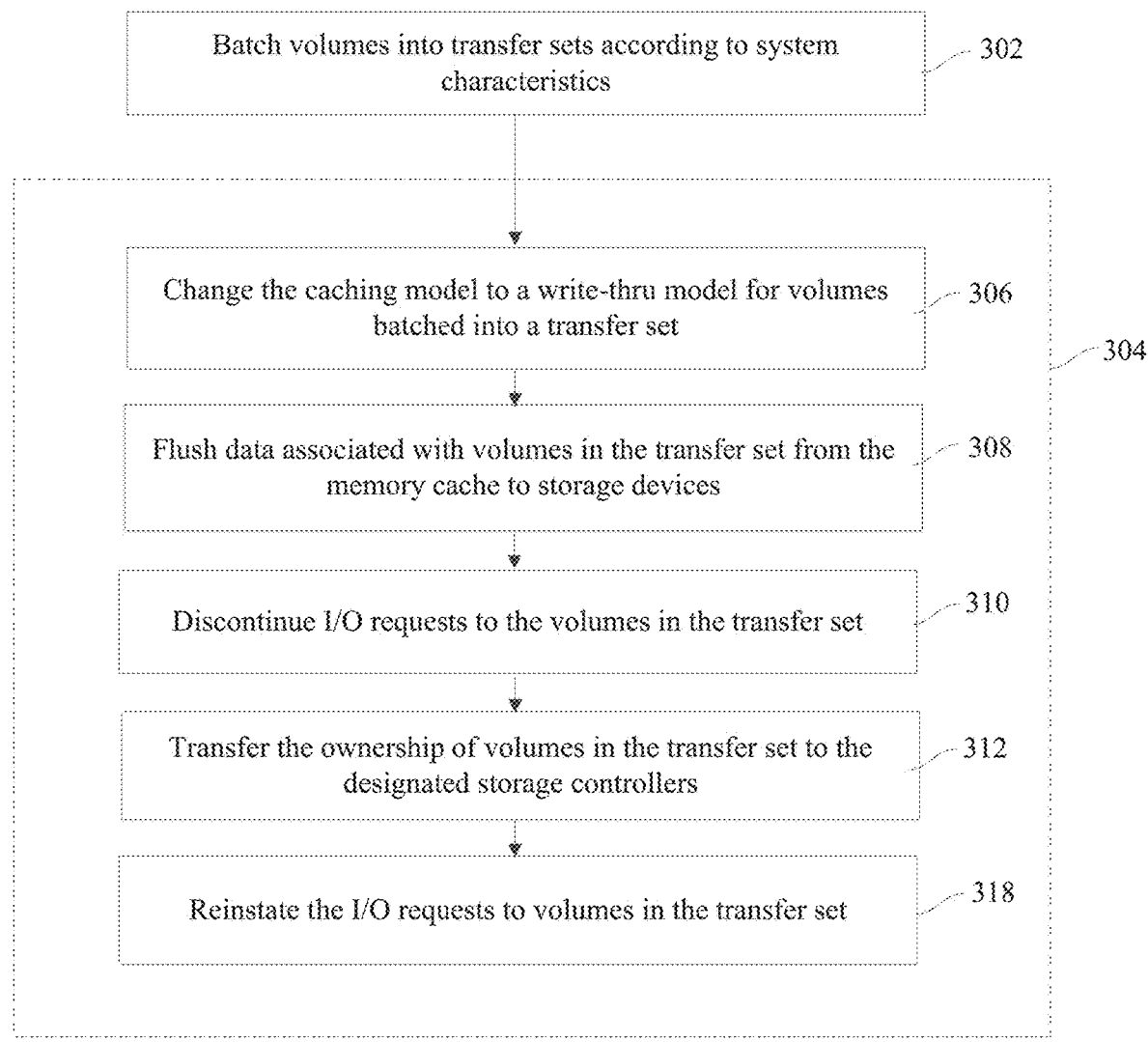
FIG. 3 is a flowchart of a method for transferring volumes, according to an embodiment.

FIG. 3 is a flowchart of a method 300 for transferring volumes, according to an embodiment. Method 300 may be implemented in hardware, software, or a combination thereof, of the components described in FIG. 1.

At operation 302, volumes are aggregated into transfer sets. As discussed above, volume transfer module 124 may aggregate volumes 114 into transfer sets according to the storage media type, characteristics within the media that impact system performance, storage controller ownership, etc. For example, when transferring ownership of volumes 114A, 114B, and 114C, volume transfer module 124 may aggregate volumes 114B and 114C into the first transfer set and volume 114A into a second transfer set.

At operation 304, the ownership of volumes in each transfer set is transferred as a single transaction. In a non-limiting embodiment, the first transfer set and the second transfer set may be transferred sequentially. In this way, volumes 114B and 114C in the first transfer set are transferred in one transaction and volume 114A in the second transfer set is transferred as another transaction. In an embodiment, each transaction may include operations 306-314.

At operation 306, a caching model is changed. For example, storage system 106 may change the caching model for cache 118 to a write-through model. In a further embodiment, storage system 106 may change the caching model for volumes 114 in the transfer set whose ownerships are being transferred. In this way, data changes from I/O requests already received by storage system 106 are transferred to the volumes 114 during the I/O requests and are not stored in cache 118.

At operation 308, the memory cache is flushed. For example, cache 118 that stores data for volumes 114 in the transfer set is flushed such that the data is transferred from cache 118 to storage devices 120.

At operation 310, I/O requests from hosts to the volumes in the transfer set are discontinued. For example, storage system 106 may issue messages to hosts 102 that prevent hosts 102 from sending I/O requests to volumes 114 in the transfer set.

At operation 312, ownership of volumes in the transfer set is transferred to the designated storage controllers. For example, volume transfer module 124 transfers ownership of volumes in the transfer set to the designated storage controllers 108.

At operation 314, I/O requests for the volumes in the transfer set are reinstated. For example, the storage system 106 may reinstate the I/O requests from hosts 102 to volumes 114 that were discontinued in operation 310. In an embodiment, operation 314 may be delayed to further reduce latency in the storage system 106.

Handling of the Quick Cable Disconnect

In an embodiment, storage system 106 may identify different communication paths or links 110 between hosts 102 and volumes 114. To identify links 110, one or more hosts 102 may include a host multipath driver 126. In an embodiment, host multipath driver 126 communicates with one or more storage controllers 108. In an embodiment, host multipath driver 126 may identify one or more links 110 that hosts 102 use to transmit I/O requests to volumes 114. To identify one or more links 110, host multipath driver 126 may perform a path discovery process. In the path discovery process, host multipath driver 126 may transmit identification query commands to storage controllers 108A and 108B. The identification query commands query paths to volumes 114A-F from storage controllers 108A and 108B. Once host multipath driver 126 receives responses to the identification query commands, the host multipath driver 126 parses the responses to identify paths to volumes 114 from storage controller 108A and storage controller 108B. Host multipath driver 126 then uses the identified paths to route I/O requests to volumes 114A-F.

In an embodiment, connectivity tracking module 122 of each storage controller 108 may track the identification query commands sent by host multipath driver 126. Additionally, connectivity tracking module 122 may also track low-level protocol (e.g. physical connection) information to understand which paths to each one of volumes 114A-F exist, have been discovered by each host 102, and are used by each host 102 to route I/O requests to storage controllers 108A and 108B. In an embodiment, connectivity tracking module 122 may use this information to determine when to transfer ownership of one or more of volumes 114A-F for load balancing, fail-back, etc., purposes. In an embodiment, connectivity tracking module 122 may also use the low-level protocol information to report connectivity issues to management host 119.

In an embodiment, when a quick disconnect and reconnect occurs on one of the paths between host 102 and storage controller 108, connectivity tracking module 122 may determine that that a disconnect occurred, but host multipath driver 126 may not. Once connection is reestablished, the path is still available to host multipath driver 126 to route I/O requests. However, connectivity tracking module 122 may not realize that host multipath driver 126 still knows about the path. This is because host multiple path driver 126 does not know that a disconnect occurred, and does not re-initiate a discovery process and re-issue the associated identification query commands to storage controller 108.

To re-discover a path when storage controller 108 has not received identification query commands from host multipath driver 126, connectivity tracking module 122 may infer an existence of a path when a path has been reconnected at the physical transport layer and when the identification query commands have been received on one of the other paths from host 102 to storage controller 108, but not on each path. Additionally, connectivity tracking module 122 may infer existence of the path when connectivity tracking module 122 receives commands other than identification query commands from host multipath driver 126 of host 102. In this way, the connectivity tracking module 122 may identify disconnect scenarios where host multipath driver 126 does not identify a disconnect to volume 114 and does not initiate a path discovery process because a connection is quickly re-established.

In an embodiment, to re-discover a path during a quick cable disconnect, connectivity tracking module 122 may also receive identification query commands via at least one path associated with a given host 102 and volume 114, and not the discovery commands received via every path.

Figure 4:
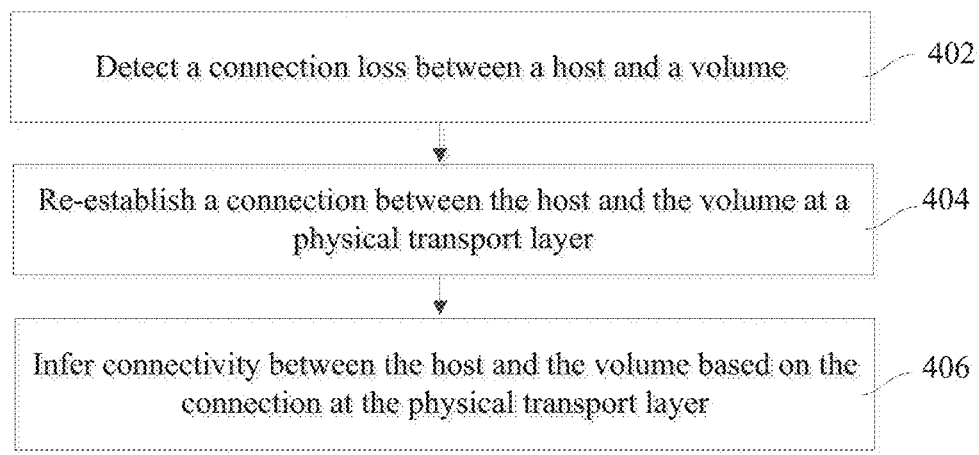
FIG. 4 is a flowchart of a method for identifying a path between a host and volume, according to an embodiment.

FIG. 4 is a flowchart of a method 400 for identifying a path between host 102 and one of volumes 114, according to an embodiment. Method 400 may be implemented in hardware, software, or a combination thereof, of the components described in FIG. 1.

At operation 402, a quick connection loss between a host and a volume is detected. For example, connectivity tracking module 122 detects a quick connection loss, such as a quick cable disconnected between host 102 and volume 114A.

At operation 404, a physical transport layer reconnection is established. For example, connectivity tracking module 122 receives an indication that storage controller 108A owning volume 114A and host 102 reconnected at the physical transport layer.

At operation 406, connectivity between a host and volume is inferred. For example, connectivity tracking module 122 infers connectivity between host and volume on the path disconnected in operation 402 because connectivity tracking module 122 may have established a connection at the physical transport layer and/or received commands other than identification query commands on the reconnected path.

Avoiding Bandwidth Limitation in a Target Failback Operation

In an embodiment, volume transfer module 124 may also determine when a failback operation from storage controller 108B to storage controller 108A may occur such that the storage system 106 does not experience undue latency or latency spikes. For example, initially storage controller 108A may have had ownership of volume 114A, but due to a fault in storage system 106, volume transfer module 124 may have transferred the ownership of volume 114A from storage controller 108A to storage controller 108B. Once storage controller 108A has recovered from the fault and hosts 102 have re-established access to volume 114A via the ITL nexus, storage controller 108A may initiate a failback operation of volume 114A from storage controller 108B to storage controller 108A. As discussed above, the host 102 regains access to volume 114A using a device discovery process that identifies an ITL nexus between volume 114A and host 102.

In some embodiments, multiple paths may exist between host 102 and storage controllers 108A and 108B. In these embodiments, storage controller 108A may be a preferred storage controller 108, while storage controller 108B may be a non-preferred storage controller 108. Further, prior to a failover operation of volume 114A from storage controller 108A to storage controller 108B there may have initially existed two links between host 102 and storage controller 108A and zero or one link between host 102 and storage controller B. However, after the failover operation of volume 114A from storage controller 108A to storage controller 108B, there may be two links 110 between host 102 and storage controller B and one link 110 between host 102 and storage controller 108A. This scenario may occur when subsequent to the failover operation host 102 used a round-robin path selection policy to establish a second link 110 between host 102 and storage controller 108B in order to maximize bandwidth and I/O throughput. Then, after the storage controller 108A recovered from the fault, host 102 created a single link 110 between host 102 and storage controller 108A.

In this scenario, if volume transfer module 124 were to perform a failback operation and transfer volume 114A from storage controller 108B back to storage controller 108A, the bandwidth between host 102 and volume 114A would be limited and would have an adverse effect on the I/O throughput. This is because the same number of links 110 that existed between host 102 and storage controller 108A before the connectivity fault has not been restored after storage controller 110A recovered from the connectivity fault.

To maximize bandwidth after the failback operation, volume transfer module 124 may compare the number of links 110 between host 102 and storage controller 108A before and after the storage controller 108A recovers from the connectivity fault. For example, volume transfer module 124 may compare the number of links 110 from host 102 to storage controller 108A that existed before the failover operation occurred and after the storage controller 108A recovered, but prior to the failback operation. If the number of links 110 after storage controller 108A recovers is the same or greater than the number of links 110 prior to the failback operation, volume transfer module 124 may initiate the failback operation of volume 114A from storage controller 108B to storage controller 108A. On the other hand, if the number of links 110 from host 102 to storage controller 108A after storage controller 108A recovers is less than the number of links 110 that existed before the connectivity fault, volume transfer module 124 may defer the failback operation until host 102 discovers additional links 110 to storage controller 108A or performs further bandwidth analysis to determine whether the failback operation will disrupt the I/O throughput.

In an embodiment, volume transfer module 124 may maintain a counter that identifiers the connected and discovered links 110 before failover operation and prior to the failback operation for each host 102 and storage controller 108 pair. The volume transfer module 124 may then compare the number of counters before the failover operation and prior to the failback operation to determine whether to initiate the failback operation of volume 114.

Figure 5:
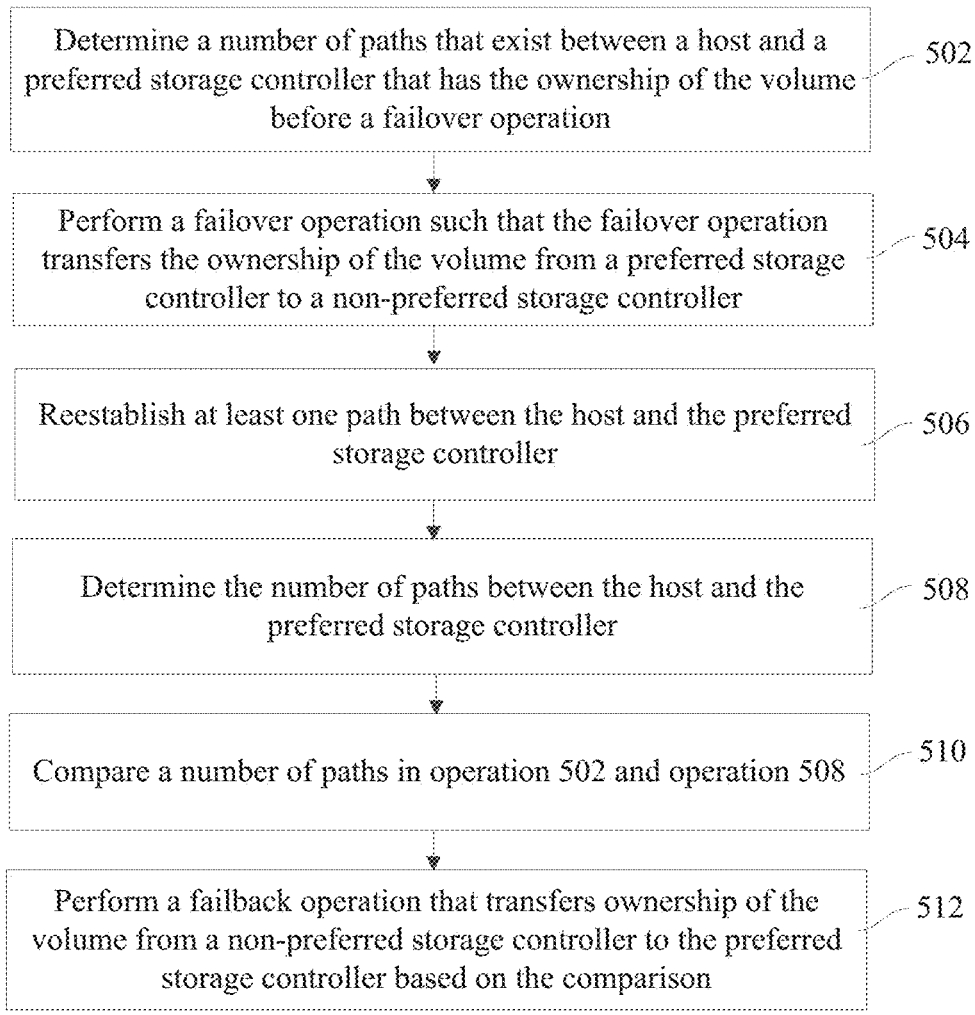
FIG. 5 is a flowchart of a method for determining whether to perform a failback operation, according to an embodiment.

FIG. 5 is a flowchart of a method 500 for determining whether to perform a failback operation, according to an embodiment. Method 500 may be implemented in hardware, software, or a combination thereof, of the components described in FIG. 1.

At operation 502, a number of paths between a host and a preferred storage controller before a failover operation is determined. For example, volume transfer module 124 may determine the number of connections between host 102 and storage controller 108A, and store the number of paths in a first counter.

At operation 504, a failover operation is performed. For example, due to a fault in storage controller 108A, a connectivity fault in storage system 106, etc., the ownership of volume 114A is transferred from storage controller 108A to storage controller 108B.

At operation 506, the preferred storage controller recovers and paths are reestablished. For example, storage controller 108A recovers from the fault, and host 102 re-establishes links 110 between host 102 and storage controller 108A.

At operation 508, a number of paths between the host and the preferred storage controller is determined. For example, volume transfer module 124 may determine the number of paths between host 102 and storage controller 108A. Volume transfer module 124 may store the number of paths in the second counter.

At operation 510, a number of paths that exist between the host and the preferred storage controller at operation 502 and operation 508 is compared. For example, volume transfer module 124 compares the number of paths between host 102 and storage controller 108A before and after a failover operation.

At operation 512, the failback operation is performed. For example, based on the values of the counters in operation 502 and operation 508, volume transfer module 124 may initiate a failback operation of volume 114A from storage controller 108B to storage controller 108A. In an embodiment, when the second counter is the same or greater than the first counter, the volume transfer module 124 may initiate a failback operation.

What is claimed is:

1. A method comprising:
   determining a number of paths between a host and a first storage controller, wherein the first storage controller has ownership of a volume;
   performing a failover operation that transfers ownership of the volume from the first storage controller to a second storage controller;
   determining a number of paths between the host and the first storage controller after the failover operation;
   comparing the number of paths before the failover operation to the number of paths after the failover operation; and
   transferring the ownership of the volume from the second storage controller to the first storage controller based on the comparison identifying that the number of paths after the failover operation is equal to or greater than the number of paths before the failover operation.

2. The method of claim 1, wherein the comparing the number of paths further comprises:
   comparing a first counter that tracks the number of paths between the host and the first storage controller prior to the failover operation with a second counter that tracks the number of paths between the host and the first storage controller after the failover operation.

3. The method of claim 1, wherein the transfer of ownership of the volume from the second storage controller is based at least in part on the number of paths between the host and the first storage controller before the failover operation being equal to the number of paths between the host and the first storage controller after the failover operation.

4. The method of claim 1, wherein the transfer of ownership of the volume from the second storage controller is based at least in part on the number of paths between the host and the first storage controller before the failover operation being greater than the number of paths between the host and the first storage controller after the failover operation.

5. The method of claim 1, further comprising:
reestablishing at least one path between the host and the first storage controller after the failover operation.

6. The method of claim 1, wherein the number of paths between the host and the first storage controller before the failover operation is different from the number of paths between the host and the first storage controller after the failover operation.

7. The method of claim 1, wherein the second storage controller has not owned the volume prior to the failover operation.

8. The method of claim 1, wherein the first storage controller is configured as a preferred storage controller for the host for accessing the volume.

9. The method of claim 1, further comprising:
initiating the failover operation in response to a connectivity fault between the host and the first storage controller.

10. A computing device comprising:
a non-transitory memory containing machine readable medium comprising machine executable code having stored thereon instructions for performing a method of transferring ownership of a volume; and
a processor coupled to the memory, the processor configured to execute the machine executable code to cause the processor to:
determine a number of paths between a host and a first storage controller, wherein the first storage controller has ownership of the volume;
determine a connectivity fault between the host and the first storage controller;
initiate a failover operation in response to the connectivity fault;
transfer, during the failover operation, the ownership of the volume from the first storage controller to a second controller;
determine a number of paths between the host and the first storage controller after the failover operation;
compare the number of paths before the failover operation to the number of paths after the failover operation; and
transfer the ownership of the volume back from the second storage controller to the first storage controller based on comparison identifying that the number of paths after the failover operation is equal to or greater than the number of paths before the failover operation.

11. The computing device of claim 10, wherein the processor is further configured to execute the machine executable code to cause the processor to:
compare a first counter that tracks the number of paths between the host and the first storage controller prior to the failover operation with a second counter that tracks the number of paths between the host and the first storage controller after the failover operation.

12. The computing device of claim 10, wherein the processor is further configured to execute the machine executable code to cause the processor to:
reestablish at least one path between the host and the first storage controller after the failover operation.

13. The computing device of claim 10, wherein the number of paths between the host and the first storage controller before the failover operation is different from the number of paths between the host and the first storage controller after the failover operation.

14. The computing device of claim 10, wherein the second storage controller has not previously owned the volume prior to the failover operation.

15. A non-transitory machine-readable medium having stored thereon instructions for transferring ownership of a volume, comprising machine executable code which when executed by an at least one machine, causes the at least one machine to:
track a number of paths between a host and a first storage controller using a first counter, wherein the first storage controller has ownership of the volume;
perform a failover operation that transfers ownership of the volume from the first storage controller to a second storage controller;
track a number of paths between the host and the first storage controller after the failover operation using a second counter;
compare the number of paths before the failover operation to the number of paths after the failover operation using the first counter and the second counter; and
transfer the ownership of the volume from the second storage controller to the first storage controller based on comparing the number of paths identifying that the number of paths after the failover operation is equal to or greater than the number of paths before the failover operation.

16. The non-transitory machine-readable medium of claim 15, wherein the second storage controller has not previously owned the volume prior to the failover operation.

17. The non-transitory machine-readable medium of claim 15, wherein the number of paths between the first storage controller and the host is different before and after the failover operation.

18. The non-transitory machine-readable medium of claim 15, wherein the instructions further comprise machine executable code which when executed by the at least one machine causes the at least one machine to:
initiate the failover operation in response to a connectivity fault between the host and the first storage controller.

* * * * *